United States Patent [19]
Schindler et al.

[11] 3,745,367
[45] July 10, 1973

[54] METHOD AND APPARATUS FOR GENERATING TIMING PULSES WITH VARYING DISTANCES

[75] Inventors: Hans R. Schindler, Au; Peter Vettiger, Thalwil, both of Switzerland

[73] Assignee: International Business Machines Corporation, Armonk, N.Y.

[22] Filed: May 2, 1972

[21] Appl. No.: 249,581

[52] U.S. Cl. ................................. 307/108, 328/63
[51] Int. Cl. .......................................... H03k 3/00
[58] Field of Search .................. 307/108, 107, 106; 378/59, 63, 66, 67

[56] References Cited
UNITED STATES PATENTS
3,587,065   6/1971   Kuntze ............................. 307/108

Primary Examiner—Herman J. Hohauser
Attorney—John A. Jordan et al.

[57] ABSTRACT

A timing pulse generator producing periodic pulse sequences with the distances between successive pulses in each sequence varying according to a periodically varying voltage employed as the upper voltage limit to which a charging capacitor is charged. A bistable switch is responsive to the charging capacitor reaching the upper voltage limit to effect both a change in level in its output voltage and discharge of the capacitor to a lower voltage limit. Upon the charging capacitor reaching the lower voltage limit the bistable switch is again responsive to effect both a change in level in its output voltage back to its original level and the charging of the capacitor.

13 Claims, 8 Drawing Figures

METHOD AND APPARATUS FOR GENERATING TIMING PULSES WITH VARYING DISTANCES

BACKGROUND OF THE INVENTION

The present invention relates to timing pulse generation and, more particularly, to a method and apparatus for generating timing pulses whose distances from preceeding or succeeding timing pulses, respectively, vary with time.

Timing pulse generators, of the type above mentioned, have particular use in digital applications, where measured values should be indicated digitally, as for instance in digital measuring of noise levels with an indication in decibel, or of light (luxmeter), and in digital tube voltmeters. A further field of application is in logarithmic analog/digital conversion, which is utilized, for example, in digital speech-coding and video techniques. In contrast to timing pulse generation for chronometry, for example, where the best possible constancy of the distance between neighboring timing pulses over very long periods of time is the objective, it is the controlled variability of the interpulse distances which is desirable for the applications hereinabove mentioned, this variability of course, in most cases having to follow a certain periodicity.

Conventional techniques for generating timing pulses with varying distances between the pulses typically rely on circuits in which the non-linearity of a diode characteristic is used. However, most of these circuits have the disadvantage of drifting with temperature, since the diodes are extraordinarily temperature-dependent. It has been undertaken to overcome this disadvantage by placing the timing pulse generators in thermostatically controlled ovens. It is clear, however, that considerable apparatus is required for such an arrangement.

It is, therefore, an object of the present invention to provide a new method and apparatus for the generation of timing pulse sequences, which pulse sequences exhibit periodically varying distances between the respective pulses over the sequences.

It is a further object of the present invention to provide a timing pulse generator for generating pulses with periodically varying distances therebetween, which generator is greatly independent of temperature variations and which permits the realization of distances between succeeding timing pulses in accordance with optional, predetermined mathematical laws, and with moderate expenditure in circuitry.

The method and apparatus according to the principles of the present invention simply employ the value of energy stored in an energy reservoir whereby the energy is compared to two different reference values and the results of the comparison are supplied to a bistable circuit which switches states when the value of energy matches and/or surpasses one of the reference values. The output signal of the bistable circuit, which is indicative of its switching state, is utilized for controlling at least one source of energy connected to the energy reservoir.

More particularly, the time pulse generator according to the present invention is characterized by an energy reservoir and at least one source of energy connectable to the energy reservoir. In addition, two comparators are employed for comparing the value of the energy stored in the energy reservoir to two different reference values individually appertaining to the comparators. A bistable circuit responsive to the comparator outputs, is coupled to the timing pulse output and to the control input of a switch associated with the source of energy whereby respective timing pulses and control signals are produced in accordance with changes in the state of said bistable circuit.

The foregoing and other objects, features and advantages of the invention will be apparent from the following more particular description of the preferred embodiments of the invention as illustrated in the accompanying drawings.

DETAILED DESCRIPTION OF THE DRAWINGS

The principles of the method and apparatus according to the present invention are based upon comparison of the energy stored in an energy reservoir (for instance, a capacitor) to two different reference values, and the switching of the energy supplied to the energy reservoir in dependence upon the result of the comparison. For this purpose, the first one of the reference values is defined as the lower threshold and the second reference value as the upper threshold. If energy is continuously supplied to the energy reservoir, its value will eventually reach the upper threshold and cause a polarity reversal of the source of energy, whereby the energy reservoir commences to discharge until the lower threshold is reached (and possibly surpassed) whereupon the charging commences again.

In this way, the energy value pendulates continuously back and forth between the two thresholds. In the case where a capacitor is employed as the energy reservoir and two constant reference voltages are employed, the voltage at the terminals of the capacitor would have essentially a triangular form with the bases of succeeding triangles having equal lengths (the triangles would be congruent).

It is an important aspect of the present invention that only one of the reference values is constant while the other varies as a function of time. Assuming that the second reference value is, for instance, a voltage that rises linearly with time (sawtooth voltage), the voltage at the terminals of the capacitor will again have triangular form, but the lengths of the bases of succeeding triangles will increase, by a fixed percentage (with respect to the preceeding base length), since the heights of the triangles become greater and greater due to the continuously rising upper threshold. The triangles are, therefore, no longer congruent as was the case with two constant reference values, but only similar. The length of the bases of succeeding triangles form a geometrical sequence, and the increase of the distances between reference points of succeeding triangles is exponential with respect to time.

As previously stated, the result of the comparison operation is supplied to a bistable circuit which generates a constant dc output signal for each of its switching states, and which, once it occupies a switching state retains same until the opposite threshold is reached. For most applications, the pattern generated by the timing pulse generator must be repeated periodically. It is obvious that the period of the internally generated sampling interval may be used for this purpose, particularly where the application is in analog/digital conversion, or the like. Of course, an external frequency source may also be employed.

Figure 1:
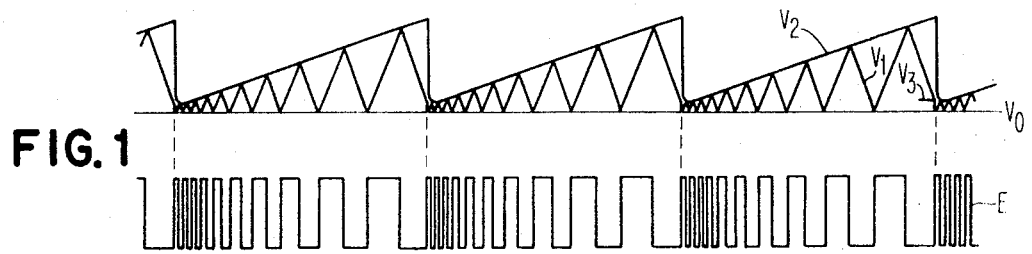
FIGS. 1 through 3 show various forms of one of the reference voltages, and the relationship of the timing pulse sequence thereto.
Figure 2:
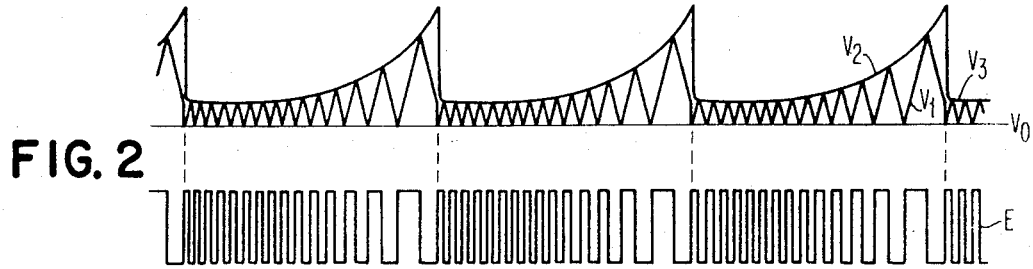
Figure 3:
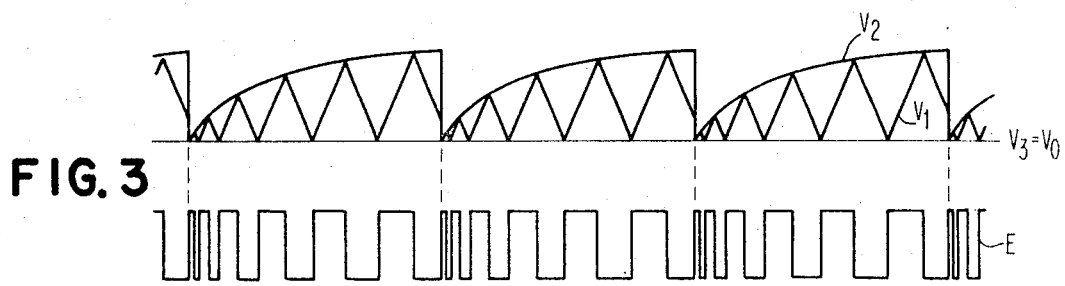

FIG. 1 shows a sawtooth envelope curve $V_2$, the form of the associated potential at the terminals of the capacitor $V_1$ and the output signal of the timing pulse generator E. FIGS. 2 and 3 show examples of non-linear envelope curves and their associated terminal potential and output signals. In all cases, the increase of the distances between adjacent output signals is clearly visible. As can be seen, in FIG. 2 the increase occurs only towards the end of the cycle. On the other hand, in FIG. 3, which depicts a RC charging operation there is initially a rapid increase according to an exponential function, with growing stabilization of the intervals towards the end of each cycle. The timing pulse generator of the present invention can be adapted to almost any application (as far as the increase or decrease of the distance between the pulses is concerned) by means of suitably distorting the sawtooth voltage by a non-linear circuit.

Figure 4:
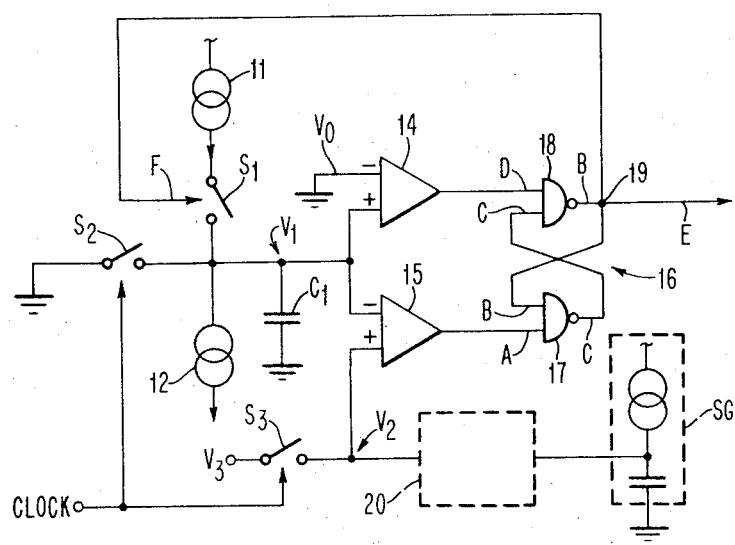
FIG. 4 is a basic circuit diagram of the timing pulse generator in accordance with the present invention.

FIG. 4 shows a basic circuit diagram of the timing pulse generator according to the present invention. Basically, the circuitry shown is a special multivibrator which is distinguished over many others by the use of only one capacitor. Capacitively coupled multivibrators generally have two capacitors which cause the specific disadvantage that these multivibrators, under certain circumstances, do not spontaneously start oscillating. They must, therefore, receive an initial external trigger pulse. With a single capacitor, as in the present case, the multivibrator cannot but start oscillating immediately under all starting conditions.

Connected to capacitor $C_1$ are two energy sources 11 and 12 which supply the currents 2I and I, respectively. The direction of current flow is defined such that the current I flows continuously out of the capacitor $C_1$, while the current 2I flows into the capacitor $C_1$ whenever the switch $S_1$ is closed, such that the resulting current is +I or −I, depending upon the position of the switch $S_1$.

The currents of current sources 11 and 12 need not necessarily obey the relation 2:1. They may, for example, supply currents of equal magnitude, requiring both current sources to be switched. They may also have unsymmetrical magnitude resulting in different leading and trailing edges of the charging and discharging currents, respectively. The charging and discharging, respectively, of the capacitor $C_1$ is terminated whenever the potential of the capacitor reaches an upper or lower threshold. These thresholds are represented by reference voltages with which the potential on capacitor $C_1$ is continuously compared. In the embodiment of the invention to be described, the lower threshold is defined as zero volts. The other (upper threshold) corresponds to the instantaneous value of a periodically varying voltage $V_2(t)$. As suggested above, this voltage $V_2$ may be a sawtooth voltage generated, for example, by a sawtooth generator comprising a current source 13 supplying the current $I_1$ and a capacitor $C_2$ operating in conjunction with a reset mechanism.

A comparison of the voltage on capacitor $C_1$ to the reference voltages is performed by two comparators 14 and 15. These comparators each have two input terminals, which in FIG. 4 are designated "+" and "−", respectively. The "+" input of comparator 14 and the "−" input of comparator 15 are connected to capacitor $C_1$, while the two other inputs of the comparators are supplied with the respective reference voltages. The output terminals of comparators 14 and 15 are coupled to a bistable circuit (below designated storage cell 16) consisting of two NAND-gates 17 and 18. Each of the NAND-gates has two input terminals, with one of the two input terminals for each gate connected to the respective output terminal of the associated comparators 14 and 15. The second input terminal of each NAND-gate is coupled to the output of the other.

The comparators 14 and 15 in FIG. 4 are designated such that they supply a negative output signal (taken hereinafter as logic level "zero") whenever their respective threshold level is reached or surpassed. Since the comparators are working against each other, they never simultaneously supply a negative output signal to the respective inputs A and D of NAND-gates 17 and 18. The NAND-gates 17 and 18 have the following truth tables, with the letters A through D designating the inputs, as shown in FIG. 4:

| Truth Table 1 NAND-Gate 17 | | | Truth Table 2 NAND-Gate 18 | | |
|---|---|---|---|---|---|
| A | B | C | C | D | B |
| 0 | 0 | 1 | 0 | 0 | 1 |
| 1 | 0 | 1 | 1 | 0 | 1 |
| 0 | 1 | 1 | 0 | 1 | 1 |
| 1 | 1 | 0 | 1 | 1 | 0 |

Under the assumed condition that comparator 15 produces an output signal corresponding to logic level "zero" (A=0), when its associated threshold has been reached or passed, then, conversely, at such time comparator 14 necessarily supplies an output signal corresponding to logic level "one" (D=1). It follows from Truth Table 1 that if A=0, then C=1 is always true. From Truth Table 2 it can be seen that with C=1 and D=1, output B of NAND-gate 18 must supply the signal 0, and this, it can further be seen, is consistent with the condition stated in the first line of Truth Table 1.

Because of the switching characteristics of the comparators, the above described state is preserved until the 0-volt threshold of the comparator 14 is actually reached. When this occurs, comparator 14 supplies a negative signal (logic level "zero") to the D-input of NAND-gate 18 (D=0). This forces the output B of NAND-gate 18 to go to logic level "one" (B=1, Table 2). With A=1, output C of NAND-gate 17 changes to logic level "zero" (C=0, Table 1). Meanwhile, the signal at input D of NAND-gate 18 has disappeared (D=1). It follows from Truth Table 2 that B remains B=1, and from Truth Table 1, that C is C=0. This is, in turn, consistent with Truth Table 2.

The output signal B of NAND-gate 18 occurring at point 19 (cf. E in FIG. 1 to 3) is used to operate the switch $S_1$, which controls the charging and discharging respectively, of the capacitor $C_1$ via current sources 11 and 12. As mentioned previously, capacitor $C_1$ is discharged with the current I when switch $S_1$ is in its open position and is charged with the current 2I−I=+I when switch $S_1$ is in its closed position.

In all cases in which the reference voltage $V_2$ must be brought back to an initial value, be it periodically or aperiodically, it is important to note that this initial value should not be zero volts, since then the transitions between charging and discharging of the capacitor $C_1$ would occur with infinitely high frequency which, of course, is undesirable. In FIG. 4, a pair of switches $S_2$ and $S_3$ are shown by which the discharging of capacitor $C_1(V_1=0$ volt$)$ and the resetting of the reference voltage $V_2$ to its initial value may be performed. The switches $S_2$ and $S_3$ may be operated, for example, with the clock frequency of the sampling frequency. In the case where the timing pulse generator of the present invention is used for speech coding, utilization of the 64 kHz sampling frequency is effective. While the capacitor $C_1$ is completely discharged at the end of each sampling interval (switch $S_2$ short-circuits the capacitor), the voltage $V_2$ is lowered only to the bias voltage $V_3$ applied to the switch $S_3$. The bias voltage $V_3$ may be 5 to 10 percent of the maximum amplitude of the reference voltage $V_2$, for example.

In case the charging and discharging currents of the capacitor are of equal magnitude, the voltage at the terminals of the capacitor assume a triangular form with all triangles being similar since their heights and base lengths have always the same mutual relation. A triangle with a peak voltage $V_1$ corresponds, then, to a complete inpulse of the output signal at point 19. Since the triangles are all isosceles, the top and gap of any one pulse will have equal lengths.

Figure 5:
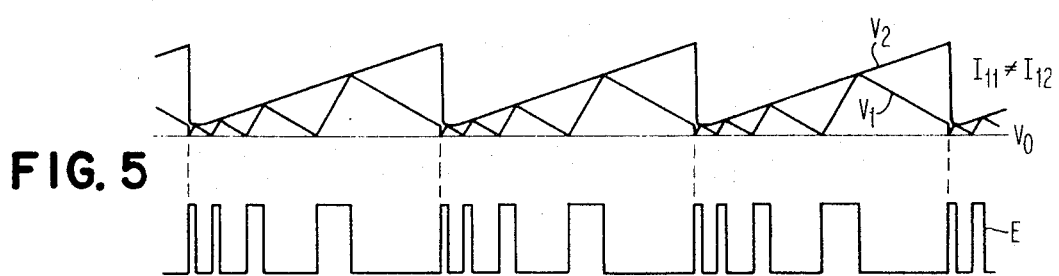
FIG. 5 shows unsymmetrical charging and discharging currents and the associated timing pulse sequence.

This is not the case where the charging currents have unequal magnitude ($I_L \neq I_3$). With unequal magnitude charging currents, the triangles of the capacitor voltage are no longer isosceles, such that top and gap of the individual pulses are of the same length. An example of a case where the charging current is greater than the discharging current is shown in FIG. 5.

The mathematical law defining the function by which the distance between succeeding pulses increase or decrease over a cycle is determined by the form of the reference voltage $V_2$. An exponential increase is obtained, as mentioned above, for (periodically) linearly increasing reference voltages. Other non-linear laws may be obtained by suitably distorting the wave shape, via introducing a non-linear circuit 20, as shown in FIG. 4. Such non-linear circuit may comprise, for example, a field effect transistor (with quadratic characteristic), a diode (with exponential or logarithmic characteristic), or other active or passive elements or combinations thereof.

Figure 6:
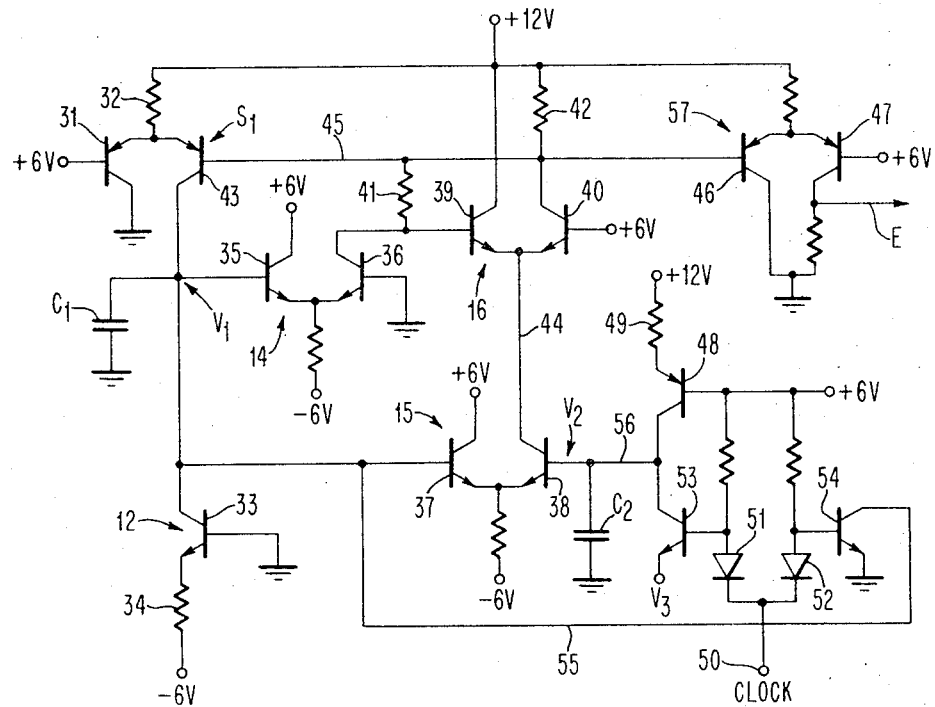
FIG. 6 is a circuit diagram of an exponential timing pulse generator.

FIG. 6 shows a simplified circuit diagram arrangement of a timing pulse generator with exponential increase of the distances between succeeding pulses, which arrangement permits the execution of the method according to the present invention. The current source 11 of FIG. 4 is shown in FIG. 6 to comprise a pnp transistor 43 and a resistor 32. The current source 12 of FIG. 4 is shown in FIG. 6 to comprise an npn transistor 33 and a resistor 34. For the embodiment shown, the relationship between the currents is 2:1 in favor of current source 11. The comparators 14 and 15 of FIG. 4 are shown in FIG. 6 comprising pairs of transistors 35–36 and 37–38, respectively. The storage cell 16 of FIG. 4 comprises transistors 39 and 40 in FIG. 6. Since the mode of operation of the latter is not self-evident it will presently be explained briefly.

When the voltage $V_1$ on capacitor $C_1$ assumes values above zero volts, the transistor 35 is conducting. With the voltage $V_1$ approaching zero volts, the transistor 36 grows more and more conductive until, at zero volts, the current is equally distributed between transistors 35 and 36. For values below zero volts, the current is shifted more and more into the right branch, which means that the transistor 36 is more conductive than the transistor 35. Since the collector current of transistor 36 flows through resistors 41 and 42, when this current becomes sufficient the voltage drop across these resistors causes the base of transistor 39 to become sufficiently negative so that transistor 39 is cut off. Therefore, the current is shifted over to the right branch of latter transistor pair 39–40, whereby transistor 40 starts conducting. As a result, the voltage drop across resistor 42 increases such that the voltage on the base of transistor 39 drops further.

At the same time that transistor 40 of FIG. 6 becomes conductive, the voltage on the base of transistor 43 drops causing the same to also become conductive, whereby the condition of FIG. 4 wherein switch $S_1$ is closed and capacitor $C_1$ becomes charged, is obtained. Meanwhile, storage cell 16 maintains its state. The voltage $V_1$ increases until comparator 15 responds. As soon as the voltage $V_1$ becomes more positive than $V_2$, the current through transistor 37 starts flowing and the flow of current through transistor 38 decreases until it finally disappears entirely. This causes the storage cell 16 to become currentless since the common emitter line 44 of transistors 39 and 40 is connected to the collector of transistor 38.

The current drawn by storage cell 16 was, prior to this currentless condition flowing through transistor 40 and had, thus, caused a voltage drop across resistor 42. The resultant reduction in current flow through resistor 42 however, creates an increase in potential on line 45 and the base of transistor 39. When the potential on the base of transistor 39 surpasses the fixed potential on the base of transistor 40, transistor 39 becomes more conductive than transistor 40 thereby causing the voltage drop across resistor 42 to further decrease and the base of transistor 39 to become more positive. The storage cell 16 has, thus, switched to its second stable state Since the potential on capacitor $C_1$ at this time is positive, the base of transistor 35 is positive, also, and comparator 14 is thus conducting in its left branch. This means that currentless transistor 36 cannot cause any voltage drop across resistors 41 and 42. Because of the increase in potential on line 45, the base of transistor 43 becomes more positive with respect to the base of transistor 31. Therefore, transistor 43 is cut off ($S_1$ opens) and, accordingly, disconnects the current +2I of capacitor $C_1$. Consequently, capacitor $C_1$, at this time, experiences discharge by the current −I. Likewise, transistor 37 experiences a reduced current flow, since its base becomes more negative. From the latter finally follows a shifting of the current over to the right branch of comparator 15, such that storage cell 16 is again supplied the full current. Summarizing, then, it can be seen that the bistable storage cell 16 is switched into one state through base control, and into the other state through controlling the entire current flow through the circuit.

The signal of the timing pulse generator of FIG. 6 occurring on line 45 (corresponding to point 19 in FIG. 4) may be coupled, as shown, to isolation amplifier 57, which amplifier comprises transistors 46 and 47. The isolation amplifier is provided due to the fact that line 45, which is used as a control line, is relatively high-ohmic and can, therefore not be loaded.

In the arrangement of FIG. 6, the variable reference voltage $V_2$ is a sawtooth voltage generated by charging and discharging a capacitor $C_2$ by means of a current source comprising a transistor 48 and a resistor 49. Connected to this sawtooth generator is a reset circuit controlled by clock pulses supplied to an input terminal 50. The clock pulses are guided through diodes 51 and 52 to the base terminals of transistors 53 and 54, which transistors the clock pulses drive into saturation. Transistor 54 connects capacitor $C_1$ to ground, via line 55, whereby capacitor $C_1$ is completely discharged upon the occurrence of each clock pulse.

The collector of transistor 53 is connected to capacitor $C_2$, via a line 56. The emitter of transistor 53 is supplied with a small bias voltage $V_3$ whose magnitude may, for example, amount to from 5 to 10 percent of the amplitude of the sawtooth voltage. With each clock pulse, capacitor $C_2$ is discharged to this latter bias voltage. By this means, it is possible to avoid the condition whereby the bistable circuit forming the storage cell 16 has to initially switch infinitely fast. From a functional point of view, the sawtooth generator shown comprising elements 48, 49, $C_2$, 53 (corresponding to SG in FIG. 4) supplies a voltage which increases linearly from a bias voltage to a maximum value, and is periodical with the clock frequency (or the sampling frequency).

The timing pulse generator of FIG. 6 may be employed, for example, in an adaptive deltacoder. Deltacoders are frequently used for the coding of speech so as to convert the speech signal occurring in analog form to a digital signal, for purposes of transmission. This technique is well known to those skilled in the art and, therefore, will not be explained in detail. The adaptive deltacoder selects its own step size, in dependence upon the instantaneous value of the analog signal. This adaptation is made indirectly by determining what the sequences of the digital information, generated by the coder, look like. From the lengths of the sequences, one can conclude whether the step size was chosen correctly (or is too small or too large) and when incorrect, in which direction a possibly necessary change of the step size should be made. However, the adaptation of the step size is not effected upon every slight deviation, but only if a deviation in one direction remains over a preselectable number of sampling intervals. This deviation manifests itself in a sequence of invariable binary values. As mentioned before, the maximum, still tolerable length of the sequence can be preselected and depends upon the admissible coding noise.

Figure 7:
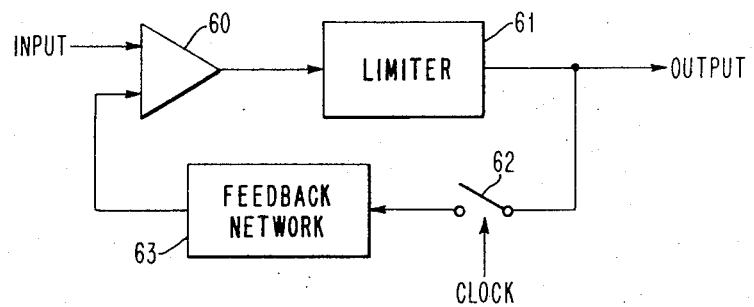
FIG. 7 is a schematic diagram of a deltacoder.

Typical simple coder arrangements employ a feedback system in which the feedback signal is quantized in amplitude and time. Accordingly, pulses are obtained which are periodic in a fixed sampling interval, with the amplitude quantizing assuming values of +1 and −1. The pulses are summed up, which in the most simple case is done in an integrator, generally in a linear network arrangement. FIG. 7 shows schematically a deltacoder comprising differential amplifier 60, limiter 61, switch 62 and feedback network 63. This arrangement is the special case of a servo system, with switch 62 being operated at the sampling frequency.

Figure 8:
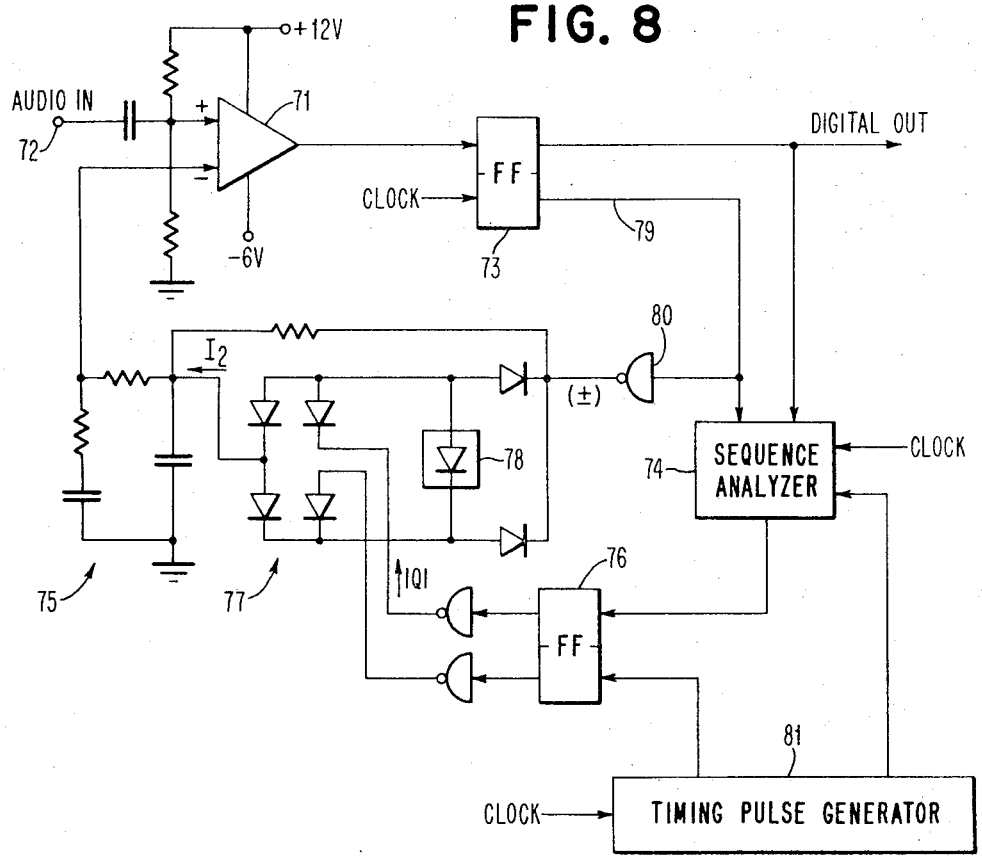
FIG. 8 is a block-diagram of a deltacoder.

FIG. 8 shows a block diagram of a deltacoder which makes use of the timing pulse generator of the present invention. Comparator 71 is supplied with the speech signal, which is fed into input terminal 72. Comparator 71 acts as quantizer when connected, as shown, to flipflop 73. Connected to the output of flipflop 73 are sequence analyzer 74, and integrator network 75. Flipflop 76, which is coupled to diode network 77, is provided for determining the absolute value of charge Q flowing into integrator 75, i.e., for establishing the step size. It is clear that the charge Q is the product of current and time, with the current in this circuit being limited, as shown, by limiter diode 78. It should be recognized that it may be possible to use a single limiter diode if the other diodes are suitably connected such that the current through the limiter diode can always flow in the same direction. Therefore, the current pulses (+ or −) have always practically the same magnitude.

As shown in FIG. 8, the signal occurring at the output 79 of flipflop 73 is coupled to inverter 80. This signal determines the sign of the current flowing into integrator 75. The duration of current flow is determined by the interval during which flipflop 76 is in its "on" state. Whenever flipflop 76 is in its "off" state, the current flows into a shunt.

Timing pulse generator 81, in accordance with the present invention, is connected to sequence analyzer 74 as well as to flipflop 76. It is controlled by the sampling signal (clock). The digital output signal of the deltacoder, appearing at the output of flipflop 73, is continuously (i.e., at clock time) monitored in that the sequence of the binary values 0 and 1 is checked. A detector contained in sequence analyzer 74 counts the identical binary values of a sequence, and causes a counter to be set to a higher or lower value whenever the sequences of identical binary value surpass, or fall short of, a predetermined value. Over-and underflow of the counter is prevented by logic circuitry. The counter keeps track of the step size (db) in binary form.

It has been found that for a deltacoder having an acceptable dynamic range, a compression ratio (i.e., ratio of largest to smallest step size) of approximately 24 db is appropriate. The difference between adjacent step sizes, then, should not exceed 2 db. This means that the coder must, for example, be able to produce 13 positive and 13 negative steps of pre-selectable size.

This latter can be achieved by having the timing pulse generator execute 25 charging and discharging operations within any one sampling interval, and by using the commencements of the charging operations as timing indications. The intervals obtained in this way grow exponentially with time.

The step size active at any one instant of time is related to the observed sequence of identical binary values by means of a comparator contained in sequence analyzer 74, and the step size is reduced, held, or increased by using the results of the comparison. As mentioned before, the step size corresponds to the charge Q flowing into the integrator 75, the charge being the product of the constant current $I_2$ flowing through limiter diode 78, and the time during which it flows. The time interval of current flow is determined by setting flipflop 76. The output signal of integrator 75 is supplied to comparator 71, whereby it is compared to the input speech signal.

What is claimed is:

1. A timing pulse generator for generating pulses having distances therebetween which vary according to a pre-selected function, comprising:
   charge storage means;

means coupled to said charge storage means to charge said charge storage means in response to a first control signal and discharge said charge storage means in response to a second control signal;

compare circuit means coupled to said charge storage means to provide a first output signal when said charge storage means charges to a first voltage level and to provide a second output signal when said charge storage means discharges to a second voltage level; and switching circuit means coupling the first and second output signal of said compare circuit means to said means to charge so that the said first output signal of said compare circuit means initiates production of said second control signal and the said second output signal of said compare circuit means initiates production of said first control signal, whereby pulses are generated having distances therebetween which vary according to said pre-selected function.

2. The timing pulse generator as set forth in claim 1 wherein said first voltage level varies with time.

3. The timing pulse generator as set forth in claim 2 wherein said first voltage level varies periodically according to said pre-selected function.

4. The timing pulse generator as set forth in claim 3 wherein said second voltage level is constant.

5. The timing pulse generator as set forth in claim 4 wherein the period of said pre-selected function is initiated by regularly spaced clock pulses which act to initiate a sampling interval corresponding to said period.

6. The timing pulse generator as set forth in claim 5 wherein switch means coupled to said charge storage means are responsive to the said clock pulses which initiate said sampling interval to discharge said charge storage means to said constant voltage level.

7. The timing pulse generator as set forth in claim 6 wherein said first voltage level varies periodically according to a sawtooth waveform function.

8. A method of generating timing pulses in periodic sequences with the distance between successive pulses in each sequence varying according to a pre-selected function, comprising the steps of:

causing a capacitor to charge toward a first voltage level in response to a first control indication produced each time said capacitor reaches a second voltage level and causing said capacitor to discharge toward said second voltage level in response to a second control indication produced each time said capacitor reaches said first voltage level, with said first voltage level periodically varying with time according to said function;

comparing the voltage on said capacitor with said first voltage level to produce a first signal when the voltage on said capacitor charges to said first voltage level and comparing the voltage on said capacitor with said second voltage level to produce a second signal when the voltage on said capacitor charges to said second voltage level; and producing said first control indication in response to said second signal and said second control indication in response to said first signal, whereby said first and second control indications define the pulses in said periodic sequences.

9. The method as set forth in claim 8 wherein said second voltage level is constant.

10. The method as set forth in claim 9 wherein the period of said pre-selected function is initiated in accordance with the occurrence of regularly spaced clock pulses.

11. The method as set forth in claim 10 wherein said first voltage level periodically varies to form a sawtooth waveform.

12. The method as set forth in claim 11 including the further step of causing said capacitor to discharge to said constant voltage level each time a clock pulse occurs.

13. A timing pulse generator for generating timing pulses in periodic sequences with the distance between successive pulses in each sequence varying according to a pre-selected function, comprising:

capacitor charge storage means;

means coupled to said capacitor charge storage means to charge said capacitor charge storage means in response to a first control signal and to discharge said capacitor charge storage means in response to a second control signal;

first and second reference voltage means with the amplitude of the voltage of said first reference voltage means periodically varying with time and with the amplitude of the voltage of said second reference voltage means being constant with time;

compare circuit means coupled to said capacitor charge storage means and to said first and second reference voltage means for comparing the voltage level on said capacitor charge storage means with the amplitude of the respective reference voltages of said first and second reference voltage means so as to produce a first output signal therefrom when the voltage level on said capacitor charge storage means reaches the said amplitude of the voltage of said first reference voltage means and to produce a second output signal therefrom when the voltage level on said capacitor charge storage means reaches the said amplitude of the voltage of said second reference voltage means; and bistable switching circuit means coupled between said compare circuit means and said means to charge said capacitor charge storage means so as to produce the said first control signal in response to the said second output signal from said compare circuit means and to produce the said second control signal in response to the said first output signal from said compare circuit means, whereby said bistable switching circuit means acts to produce the said timing pulses in said periodic sequences with the distance between successive pulses in each equence varying according to the manner in which said first reference voltage means periodically varies with time.

* * * * *